United States Patent
Tsukagoshi et al.

(10) Patent No.: US 8,538,968 B2
(45) Date of Patent: *Sep. 17, 2013

(54) SAVING DEVICE FOR IMAGE SHARING, IMAGE SHARING SYSTEM, AND IMAGE SHARING METHOD

(75) Inventors: Kazuma Tsukagoshi, Kanagawa (JP); Yukinori Yokoyama, Kanagawa (JP); Karin Kon, Kanagawa (JP); Yuto Furukawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,202

(22) Filed: Jun. 13, 2012

(65) Prior Publication Data

US 2012/0278390 A1 Nov. 1, 2012
US 2013/0117366 A2 May 9, 2013

Related U.S. Application Data

(63) Continuation of application No. 12/411,982, filed on Mar. 26, 2009, now Pat. No. 8,224,824.

(30) Foreign Application Priority Data

Mar. 26, 2008 (JP) ................................. 2008-080212

(51) Int. Cl.
*G06F 7/08* (2006.01)
(52) U.S. Cl.
USPC ........................................................ 707/737
(58) Field of Classification Search
USPC ............................ 707/737, E17.019, E17.107
See application file for complete search history.

(56) References Cited

U.S. PATENT DOCUMENTS

| 7,411,606 | B2 | 8/2008 | Anderson |
| 7,502,795 | B1 | 3/2009 | Svendsen et al. |
| 7,747,625 | B2 * | 6/2010 | Gargi et al. ................... 707/737 |
| 2002/0054035 | A1 | 5/2002 | Nitta |
| 2002/0055957 | A1 * | 5/2002 | Ohsawa ........................ 707/513 |
| 2003/0189739 | A1 * | 10/2003 | Yamaguchi et al. .......... 358/527 |

(Continued)

FOREIGN PATENT DOCUMENTS

| JP | 10208071 A | 8/1998 |
| JP | 2002157238 A | 5/2002 |

(Continued)

OTHER PUBLICATIONS

Japanese Office Action dated May 22, 2012 issued in corresponding Japanese Patent Application No. 2009-076947.

(Continued)

*Primary Examiner* — James Trujillo
*Assistant Examiner* — Soheila Davanlou
(74) *Attorney, Agent, or Firm* — Sughrue Mion, PLLC

(57) ABSTRACT

The saving device for image sharing saves images offered by a sharer of the images for image sharing and accessibly shares in an album form among at least one share. The device includes a sharee layout storing means configured to store first layout information of a sharee's album, a shared area determining means configured to determine a shared area to be shared in the sharee's album from a sharer's album, and a layout changing means configured to automatically change a layout of the shared area based on the first layout information of the at least one sharee. An image sharing system includes the device, and an image sharing method uses the device.

27 Claims, 12 Drawing Sheets

(56) References Cited

U.S. PATENT DOCUMENTS

| | | |
|---|---|---|
| 2005/0128305 A1 | 6/2005 | Hamasaki et al. |
| 2005/0235011 A1 | 10/2005 | Mimium et al. |
| 2006/0126093 A1 | 6/2006 | Fedorovskaya et al. |
| 2008/0154931 A1* | 6/2008 | Jacobs et al. .................. 707/101 |
| 2008/0306995 A1* | 12/2008 | Newell et al. .............. 707/104.1 |

FOREIGN PATENT DOCUMENTS

| | | |
|---|---|---|
| JP | 2003233555 A | 8/2003 |
| JP | 2003333260 A | 11/2003 |
| JP | 2007272719 A | 10/2007 |
| JP | 2007310730 A | 11/2007 |
| JP | 2007316939 A | 12/2007 |
| JP | 2007334696 A | 12/2007 |

OTHER PUBLICATIONS

Notification of Reasons for Refusal, dated May 14, 2013, issued in related JP Application No. 2012-186586, 7 pages in English and Japanese.

* cited by examiner

FIG. 3

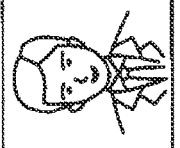

| 1 | SHAREE ID | 00001 | |
|---|---|---|---|
| 2 | REPRESENT-ATIVE IMAGES | PRIORITY NO. = 1 | PRIORITY NO. = 2 |
| 3 | DELIVERY DESTINATION INFORMATION | xxxxxx.ne.jp | |
| 4 | SHAREE LEVEL | HIGH | |
| 5 | SEX | FEMALE | |
| 6 | PREFERRED LAYOUT INFORMATION | PHOTO MOUNT: 001 FRAME: 003 TRIMMING: ROUNDED CORNER | |
| 7 | PREFERRED IMAGE KEYWORDS | PLANTS, FLOWERS | |

| 1 | SHAREE ID | 00002 | |
|---|---|---|---|
| 2 | REPRESENT-ATIVE IMAGES | PRIORITY NO. = 1 | PRIORITY NO. = 2 |
| 3 | DELIVERY DESTINATION INFORMATION | YYYYYY.ne.jp | |
| 4 | SHAREE LEVEL | MEDIUM | |
| 5 | SEX | MALE | |
| 6 | PREFERRED LAYOUT INFORMATION | PHOTO MOUNT: 003 FRAME: NONE TRIMMING: NONE | |
| 7 | PREFERRED IMAGE KEYWORDS | CARS | |

FIG. 4
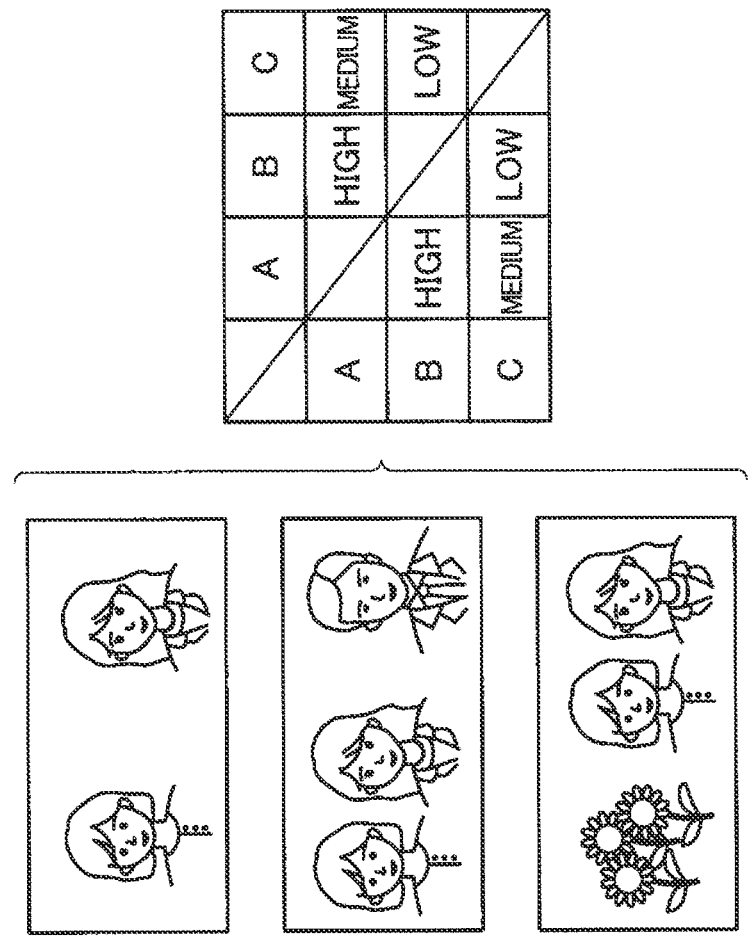
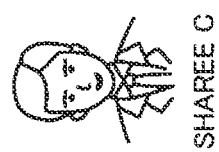
SHAREE C
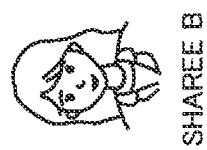
SHAREE B
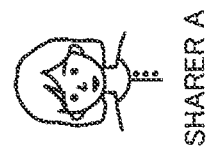
SHARER A

FIG. 11

[RESULTS OF SHARED IMAGE INFORMATION EXTRACTION]

| | | |
|---|---|---|
| ① | NUMBER OF IMAGES CONTAINING SHAREE | 10 |
| ② | NUMBER OF PREFERRED IMAGES | 5 |
| ③ | NUMBER OF PREFERRED IMAGES CONTAINING SHAREE | 3 |
| ④ | RANKING OF SIZES OF IMAGES SHARED WITH SHAREE, FROM THE LARGEST IN NUMBER ONWARD | 30*30<br>30*40<br>10*20 |
| ⑤ | RANKING OF MONTHS IN WHICH IMAGES SHARED WITH SHAREE WERE TAKEN, FROM THE LARGEST/SMALLEST IN NUMBER OF IMAGE-TAKING DAYS ONWARD | DECEMBER<br>JANUARY<br>AUGUST |
| ⑥ | RANKING OF PLACES (PREFECTURES) WHERE IMAGES SHARED WITH SHAREE WERE TAKEN, FROM THE LARGEST/SMALLEST IN NUMBER OF IMAGE TAKING ONWARD | TOKYO<br>KANAGAWA<br>CHIBA |

[RESULTS OF SHAREE INFORMATION EXTRACTION]

| | | |
|---|---|---|
| ⑦ | IMAGE SIZE MOST FOUND IN ALBUM | 10*20 |
| ⑧ | MONTH WITH MOST/LEAST DAYS FOUND IN ALBUM | DECEMBER |
| ⑨ | PLACE MOST/LEAST FOUND IN ALBUM | CHIBA |

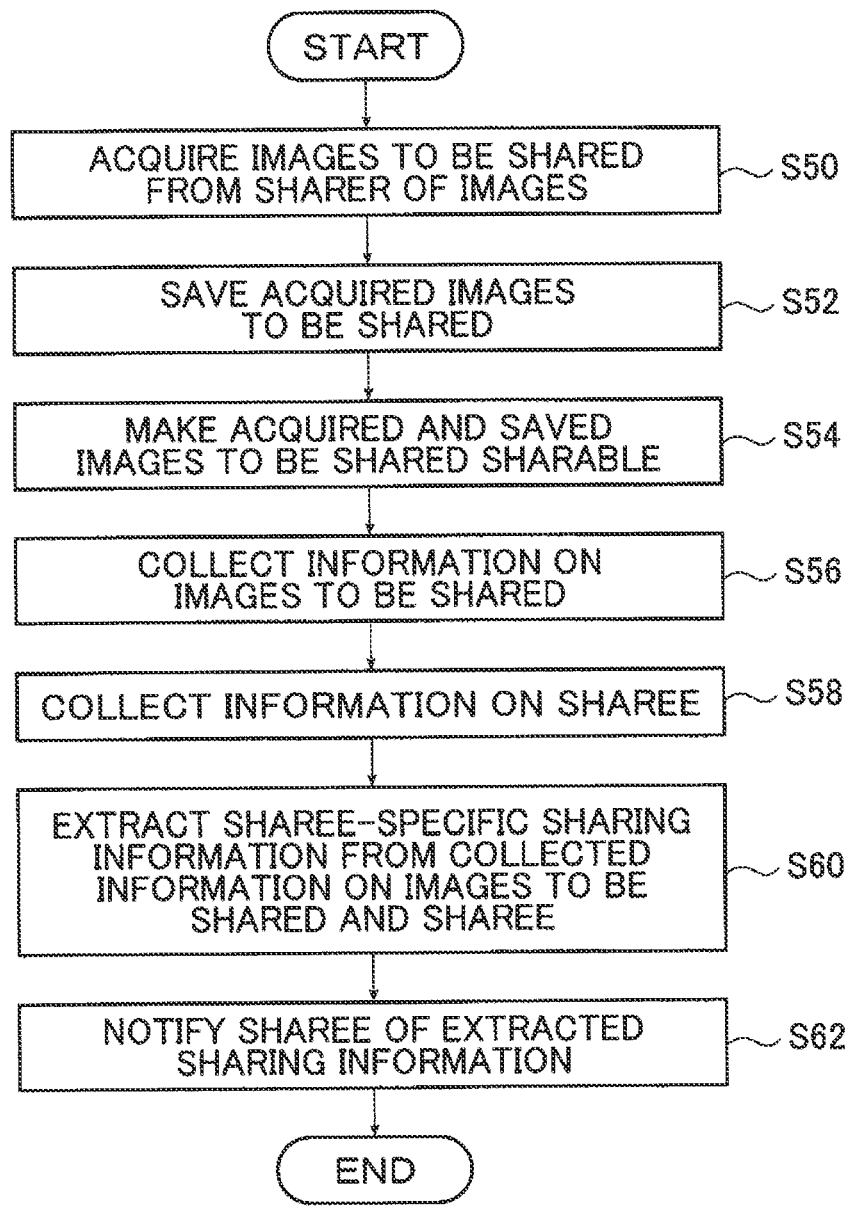

SAVING DEVICE FOR IMAGE SHARING, IMAGE SHARING SYSTEM, AND IMAGE SHARING METHOD

CROSS-REFERENCE TO RELATED APPLICATIONS

This application is a Continuation of U.S. application Ser. No. 12/411,982 filed Mar. 26, 2009, which claims priority under 35 U.S.C. 119 from Japanese Patent Application No. 2008-080212 filed Mar. 26, 2008. The contents of the prior applications are incorporated by reference in their entirety.

BACKGROUND OF THE INVENTION

The present invention relates to a saving device for image sharing, such as an image sharing server, as well as an image sharing system and an image sharing method for classifying, saving, and sharing among a plurality of users the image data on a plurality of images offered by the sharer thereof, for instance, images uploaded to a server on a network, and more specifically to a saving device for image sharing such as an image sharing server, an image sharing system, and an image sharing method capable of automatically classifying a group of images associated with a subject from a large-volume image group offered by the sharer thereof, for instance, a large-volume image group uploaded to a server on a network, and sharing the image data among a plurality of users depending on their personal preference.

In recent years, there have been proposed various image sharing systems configured to share among a plurality of users image data uploaded to a server or the like on a network by a user. Among such systems, there have been proposed systems configured to share images by extracting images of each user or images associated with each user from a plurality of uploaded image data, and transmitting or enabling browsing of image data that satisfies specific conditions on a per user basis.

For example, in the information providing device and information providing method described in JP 2007-310730 A, a plurality of users accumulate data browseable via a network and make such data available to other users. In JP 2007-310730 A, a user (image owner) uploads images to a photo site on a network, manages the images in an album, and makes the images available for browsing to other specific users in accordance with their browsing requests. Further, JP 2007-310730 A makes it possible to establish access restrictions, thereby making it possible to prevent a significant increase in device load when access is temporarily concentrated at the time the specific users are prompted to browse the data. In addition, it is described in JP 2007-310730 A that image sharing is carried out by informing the users permitted by the owner to browse, by e-mail and the like from a photo site, of the URLs of the destinations where digital images are stored.

In JP 2007-272719 A, it is described that the photographic processing apparatuses provided in different shops and networked with one another notify one another of registered information including the name (ID) of a taken-image file and shop information (position information (IP address) of a photographic processing apparatus on a network) as well as thumbnail images through a network, and a peer-to-peer transfer of a taken-image file is carried out from one photographic processing apparatus to another, based on the registered information, so as to acquire the taken-image file.

SUMMARY OF THE INVENTION

However, with a conventional method such as that of the above-described JP 2007-310730 A, the problem arises that, because a portion of the album of the user who uploaded the images is made available to other users, it takes much time for the browsing user to find the image that he/she would like to see among the available images when a great volume of images are made available, making the user feel inconvenienced during browsing. Further, the user is only permitted to access and browse the album of the image owner, and is not permitted to add images to the album of his/her own or perform any type of processing such as editing. In other words, the images cannot be shared.

In the conventional method described in JP 2007-310730 A, the information to be given with respect to the image sharing includes only the information that an image has been shared (information given by e-male), the way of getting access to the shared image (URL path, password), and so forth. Accordingly, different sharees may be notified of the same information, and each sharee has to follow the path to the locations of shared images in order to ascertain what images have been shared in what amount (number).

The method disclosed in JP 2007-272719 A does not avoid problems either. If the registered information includes the ID of the taken-image file and the IP address but no thumbnail images, it cannot be ascertained what images have been shared in what amount (number) unless the sharee gets access to the photographic processing apparatus storing the taken-image file by using the IP address, and opens the taken-image file by using the ID. If the registered information includes thumbnail images, it cannot be ascertained yet what images have been shared in what amount (number) unless all the thumbnail images are browsed. In the case of the photographic processing apparatus disclosed in JP 2007-272719 A, the quantity of the information of which one apparatus notifies another apparatus sharing images with it can be large, with the registered information being capable of including thumbnail images. This feature, however, cannot be applied to cellular phones and so forth with smaller capacities and, even if applicable, an increased number of thumbnail images will be hard to download.

It is therefore an object of the present invention to solve the above-described problems of prior art and provide a saving device for image sharing such as an image sharing server, an image sharing system and an image sharing method capable of displaying images that are easy to view for both the owner, i.e., sharer of the images who is to perform the sharing and the sharee who is to be the recipient of the shared images, and sharing the image data in a form enabling easy use by the sharee.

It is another object of the present invention to provide a saving device for image sharing, an image sharing system and an image sharing method capable of notifying, upon sharing of an image or album (image data), about additional information specific to the user as a sharee, such as information in which the sharee has interest and image information.

In order to achieve the above objects, the present invention provides a saving device for image sharing in which images offered by a sharer of the images for image sharing are saved and accessibly shared in an album form among at least one sharee, comprising: a sharee layout storing means configured to store first layout information of a sharee's album; a shared area determining means configured to determine a shared area to be shared in the sharee's album from a sharer's album; and a layout changing means configured to automatically change a layout of the shared area based on the first layout information of the at least one sharee.

Preferably, the saving device for image sharing of the present invention comprises: a sharer layout storing means configured to store second layout information of the sharer's album; and an inherited information storing means configured to store types of layout information to be inherited by the shared area from among the second layout information stored by the sharer layout storing means. In that case, the layout changing means further automatically changes the layout of the shared area based on the second layout information of the sharer and the inherited information.

The saving device for image sharing of the present invention preferably comprises a sharing information storing means configured to store information related to the shared area subjected to a layout change by the layout changing means, as sharing information for each shared area, with the sharing information including sharer information and photographed date and time of an image laid out in the shared area.

The saving device for image sharing of the present invention is preferably an image sharing server in which the images uploaded by the sharer can be saved and accessibly shared among the at least one sharee.

It is preferable that the saving device for image sharing of the present invention further comprises: a shared image information collecting means configured to collect information on the images to be shared; a sharee information collecting means configured to collect information on the at least one sharee; a sharing information extracting means configured to extract, from the information on the images to be shared that is collected by the shared image information collecting means and the information on the at least one sharee that is collected by the sharee information collecting means, information concerning the images to be shared in which the at least one sharee has interest as sharing information specific to the at least one sharee; and a sharing information notifying means configured to notify the at least one sharee of the sharing information extracted by the sharing information extracting means.

In order to achieve the objects as described before, the present invention also provides a saving device for image sharing in which images offered by a sharer of the images for image sharing are saved and accessibly shared among at least one sharee, comprising: an image sharing means configured to share the images offered by the sharer among the at least one sharee as images to be shared; a shared image information collecting means configured to collect information on the images to be shared; a sharee information collecting means configured to collect information on the at least one sharee; a sharing information extracting means configured to extract, from the information on the images to be shared that is collected by the shared image information collecting means and the information on the at least one sharee that is collected by the sharee information collecting means, information concerning the images to be shared in which the at least one sharee has interest as sharing information specific to the at least one sharee; and a sharing information notifying means configured to notify the at least one sharee of the sharing information extracted by the sharing information extracting means.

In order to achieve the objects as above, the present invention also provides an image sharing system in which a sharer of images offers the images for image sharing so that the images are accessibly shared among at least one sharee, comprising: the saving device for image sharing of the present invention as described above; and a terminal of the at least one sharee that accesses images shared on the saving device for image sharing.

Preferably, the image sharing system of the present invention further comprises: a terminal of the sharer that saves and uploads onto the saving device for image sharing the images; and a network on which the saving device for image sharing is disposed, and the terminal of the sharer and the terminal of the at least one sharee are connected with the saving device for image sharing through the network.

In order to achieve the objects as above, the present invention also provides an image sharing method in which images offered by a sharer of the images for image sharing are saved and accessibly shared among at least one sharee in a saving device for image sharing, comprising: storing in advance first layout information of a sharee's album; determining a shared area to be shared in the sharee's album from a sharer's album; and changing automatically a layout of the shared area based on the first layout information of the at least one sharee.

The saving device for image sharing to be used is preferably an image sharing server disposed on a network, in which the images uploaded by the sharer can be saved and accessibly shared among the at least one sharee.

Preferably, the image sharing method of the present invention further comprises: collecting information on the images to be shared; collecting information on the at least one sharee; extracting, from the collected information on the images to be shared and the collected information on the at least one sharee, information concerning the images to be shared in which the at least one sharee has interest as sharing information specific to the at least one sharee; and notifying the at least one sharee of the sharing information as extracted.

The image sharing method of the present invention preferably comprises: storing in advance second layout information of the sharer's album and inherited information which includes types of layout information to be inherited by the shared area as selected from the second layout information of the sharer's album; and changing automatically the layout of the shared area based on the second layout information of the sharer and the inherited information.

It is preferable that, in the image sharing method of the present invention, information related to the shared area subjected to a layout change is stored as sharing information for each shared area. In that case, the sharing information includes sharer information and photographed date and time of an image laid out in the shared area.

Finally, in order to achieve the objects as described before, the present invention provides an image sharing method in which images offered by a sharer of the images for image sharing are saved and accessibly shared among at least one sharee, comprising: sharing the images offered by the sharer among the at least one sharee as images to be shared; collecting information on the images to be shared; collecting information on the at least one sharee; extracting, from the collected information on the images to be shared and collected information on the at least one sharee, information concerning the images to be shared in which the at least one sharee has interest as sharing information specific to the at least one sharee; and notifying the at least one sharee of the sharing information as extracted.

According to the saving device for image sharing, an image sharing system and an image sharing method of the present invention, a predetermined range of the album owned by the sharer of the images is automatically shared in a state in which the images are laid out and edited as an album, making the images easy to browse and easy to manage for both the sharer of the images and the sharee who receives the images in comparison to conventional methods that simply deliver image data only.

Furthermore, according to the present invention, sharing is performed upon ensuring layout consistency between the shared area and the album of the sharee. As a result, the sharee can receive the image data in a form enabling easy use by the sharee, without the trouble of having to edit the shared images, etc.

According to the present invention, moreover, the information which can be extracted automatically from the shared image or album information, that is to say, the information in which the sharee has interest, is added to the information to be given, which makes it possible to ascertain with ease, namely, without following the sharing path, what images have been shared.

BRIEF DESCRIPTION OF THE DRAWINGS

FIG. 3 is a diagram showing an example of sharee information;

FIG. 4 is a conceptual diagram showing an example of a method for determining the sharee level;

FIG. 11 is a diagram showing exemplary results of the extraction of the shared image information and the sharee information in the saving device for image sharing as shown in FIG. 10; and FIG. 12 is a flowchart showing an example of the process for notification by the saving device for image sharing as shown in FIG. 10.

DETAILED DESCRIPTION OF THE PREFERRED EMBODIMENTS

The following describes in detail a saving device for image sharing of the present invention, which achieves an image sharing method of the present invention, as well as a system that utilizes this device, based on the preferred embodiments shown in the accompanying drawings.

Figure 1:
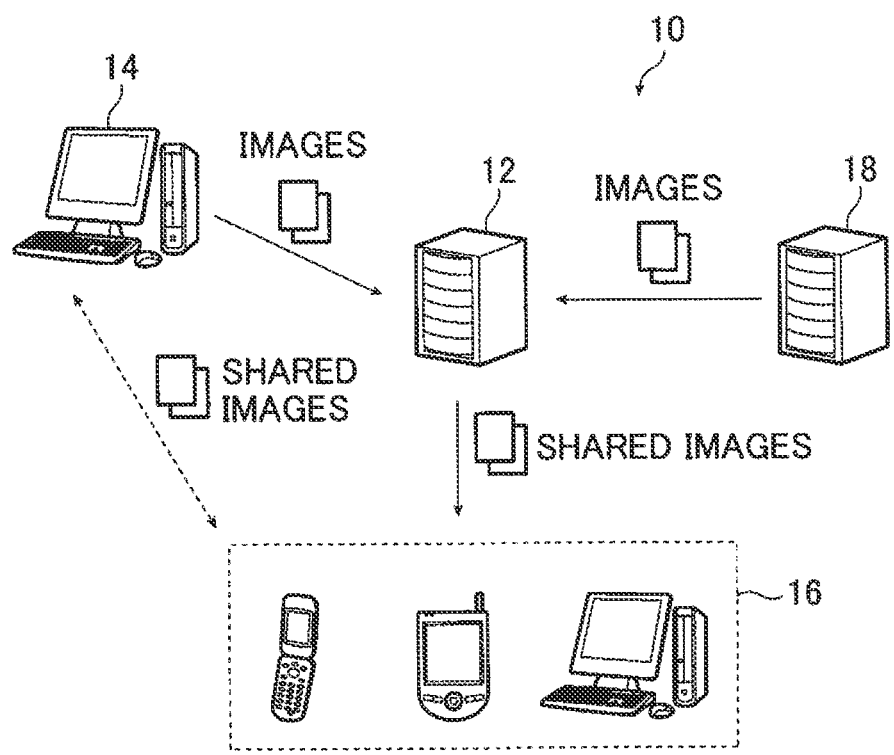
FIG. 1 is a block diagram showing an embodiment of the device configuration of an image sharing system of the present invention.

FIG. 1 is a block diagram showing an embodiment of the device configuration of an image sharing system of the present invention.

An image sharing system 10 shown in FIG. 1 comprises a sharing server 12, a personal computer (hereinafter "PC") 14 owned by an owner (hereinafter "sharer") of shared images, a terminal 16 owned by a sharee who is to be a co-owner of the shared images, and an image server 18.

The PC 14 uploads the images to be shared to the sharing server 12. While a conventional PC is used as the PC 14 in the present embodiment, the present invention is not limited thereto. Various types of devices can be used as long as the device is a terminal capable of saving image data and uploading the saved image data to the sharing server 12.

The terminal 16 is a terminal capable of browsing shared images from the sharing server 12. Various devices capable of browsing images via a network, such as a PC, cellular telephone, or portable terminal, may be used as the terminal 16. Further, in a case where a plurality of sharees exists, a plurality of terminals 16 may also exist.

The image server 18 is a server that saves images to be uploaded to the sharing server 12 and used as shared images. The image server 18 is not particularly limited. Any device capable of saving images and sending the saved images to the sharing server 12 via a network can be used. Further, a plurality of image servers 18 may also exist.

In the image sharing system 10, the sharing server 12 shares images acquired from the PC 14 of the sharer or from the image server 18 with the terminal 16 as shared images.

Figure 2:
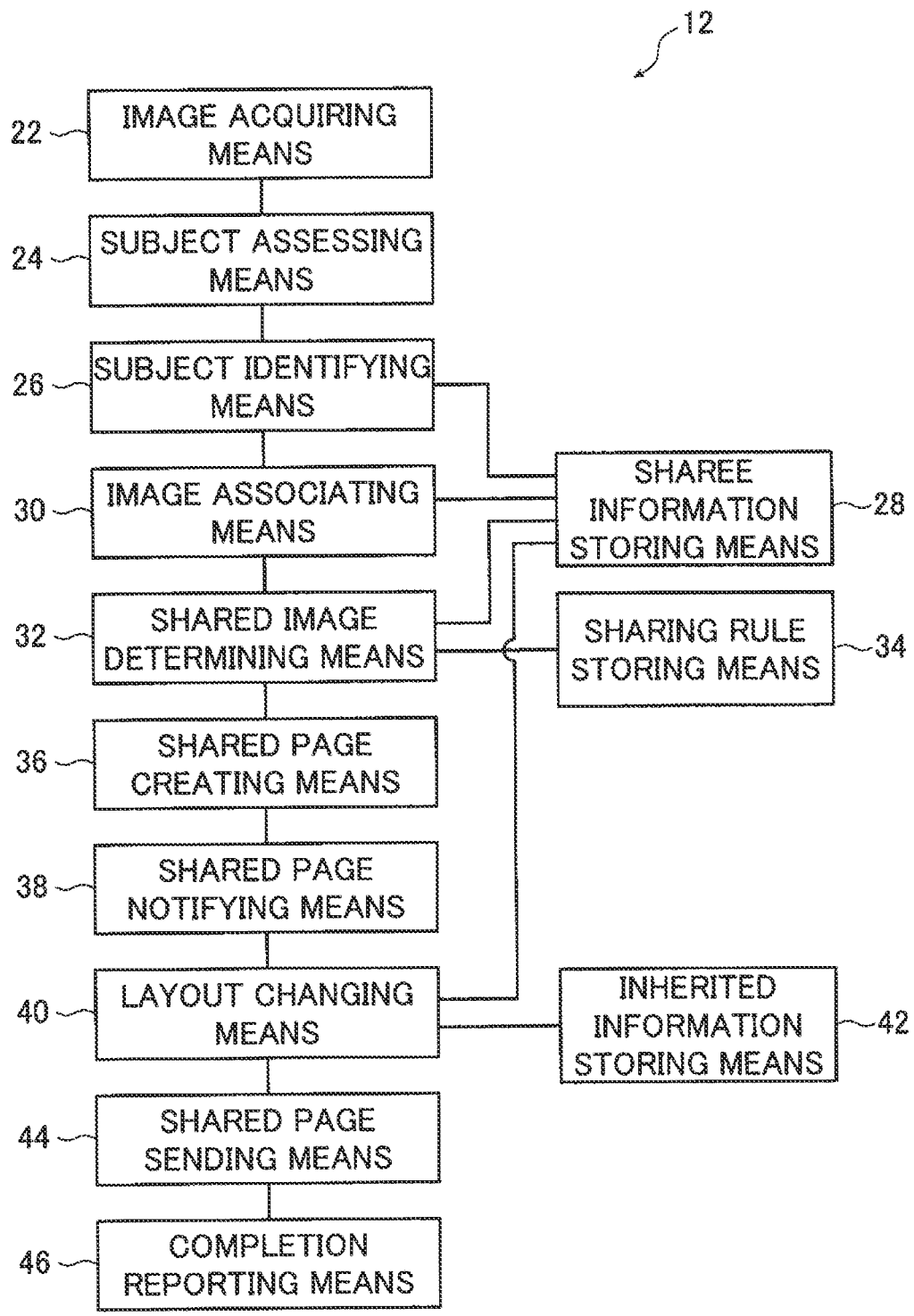
FIG. 2 is a block diagram showing an embodiment of the configuration of a saving device for image sharing of the present invention.

FIG. 2 is a block diagram showing an embodiment of the configuration of the sharing server (hereinafter "server") 12, which is a saving device for image sharing of the present invention.

The server 12 shown in FIG. 2 comprises image acquiring means 22, subject assessing means 24, subject identifying means 26, sharee information storing means 28, image associating means 30, shared image determining means 32, sharing rule storing means 34, shared page creating means 36, shared page notifying means 38, layout changing means 40, inherited information storing means 42, shared page sending means 44, and completion reporting means 46.

The image acquiring means 22 acquires image data uploaded to the image storing server on the network. The method of image uploading is not particularly limited. Any of the known various methods may be used. For example, the sharer may upload images saved on his/her PC 14 to the server 12. Or, the sharer may upload images saved on the image server 18 or images stored on a digital camera. The image acquiring means 22 acquires the image data uploaded to the server 12.

Furthermore, the image acquiring means 22 sends the acquired images to the subject assessing means 24.

The subject assessing means 24 subjects each of the images received from the image acquiring means 22 to face extraction processing, and assesses the face-extracted images as images that include a person as the subject. Furthermore, the subject assessing means 24, based on this assessment result, classifies all received images into images that include a person and images that do not include a person, and sends these images and the classification results to the subject identifying means 26.

The subject identifying means 26 performs face recognition processing on those images received from the subject assessing means 24 that have been assessed as images that include a person, and identifies and classifies the person subjects into groups per person subject.

Identification of the person subjects is performed based on sharee information, which is information of sharees who are co-owners of the shared area (hereinafter "shared page"). The method of identifying the person subjects will be described later.

The sharee information storing means 28 is a database that stores information of the sharees who are co-owners when images are shared by the server 12 as a shared page.

The sharee information storing means 28 registers in advance the IDs, face images, and shared image delivery destination information of users who use the system such as the sharer and sharees, as sharee information. This information can be added and updated as necessary. The sharee information, as described above, is used by the subject identifying means 26 to identify person subjects, and by the image associating means 30 to perform processing described later.

FIG. 3 shows an example of sharee information stored in the sharee information storing means 28.

In this embodiment, sharee IDs, representative images, delivery destination information, sharee levels, sex, layout preferences, and preferred image keywords are registered and stored as sharee information.

The sharee ID is an ID unique to the sharee, and is automatically uniquely set by the sharee information storing means 28 when sharee information is registered.

The representative image is a face image of the sharee. The representative image is used when the subject identifying means 26 identifies the person subject. That is, the subject identifying means 26 compares the face image in an image extracted by the subject assessing means 24 with the representative image stored as sharee information, and assesses whether or not the face images are of the same person. This assessment may be performed by known face recognition processing.

A plurality of representative images may be registered for a single sharee. In a case where a plurality of representative images are stored, a priority number for each representative image is set. Examples of standards for setting the priority numbers for representative images include images of the face straight on, images taken recently, images taken on a date closer to that of the image to be compared, images of a face size greater than or equal to a predetermined threshold, and images of a quality greater than or equal to a certain level. The priority numbers may be set so that those images that enable comparison with greater accuracy are given higher priority numbers.

Further, the representative images are updated occasionally as needed. This point will be described later.

The delivery destination information is the transmission destination information used when the shared page creating means 36 described later arranges shared images to be shared with a sharee and sends the access information for accessing the created shared page to the sharee. In this embodiment, an e-mail address is registered as the delivery destination information as an example. With this arrangement, the access information for accessing the shared page created in accordance with the sharee is delivered to the delivery destination information corresponding to the sharee.

The sharee level is automatically set in accordance with the relationship between the sharer and the sharee.

The sharee level is set based on the distance between the sharer and the sharee when the two are included together in an image, and based on the number of images that include the two together in the same image, for example, and is set higher in a case where the two are photographed close together, and in a case where there are many images that include the two together. Further, the sharee level is set lower in a case where the two are photographed farther apart, and in a case where there are few images that include the two together.

Further, the sharee level may be set not only between the sharer and sharee, but also between sharees.

In the example shown in FIG. 4, the sharer A and the sharee B are photographed together in all images, with a short distance between the two, resulting in a sharee B sharee level of "High." On the other hand, there is one image of sharee C and sharer A together, but in the image the two are separated by distance, resulting in a sharee C sharee level of "Medium."

The sharee level is automatically set and updated when a person subject is identified by the subject identifying means 26.

The sex of a sharee is also registered.

The preferred layout information is information pertaining to the preferred layout of the album on the network that is owned by the sharee. Matching the preferred layout information to the settings of the album owned by the sharee makes it possible to arrange the layout of the shared page with the other pages of the album owned by the sharee.

While the items set as preferred layout information are not particularly limited, the items may include, for example, the color and pattern type, etc., of the photo mount, the frame type, and whether or not there is any trimming.

Furthermore, the images uploaded by the sharer are laid out and added to the album of the sharer based on the preferred layout information of the sharer. When the sharee permits addition of the shared page from the sharer, the layout changing means 40 described later arranges the shared images using a layout corresponding to the preferences of the sharee based on the preferred layout information of the sharee, and creates and adds the shared page to the album of the sharee.

The preferred image keywords related to the preferred images of the sharee are also registered. A registered keyword may be, for example, "flower" if the sharee likes flowers or "car" if the sharee likes cars. The registered keyword does not need to be a name of an object, but may be a color such as "red" or "blue," or a scenic backdrop such as "night."

The image associating means 30 is for associating an image assessed as not including a person by the subject assessing means 24 with an image assessed as including a person.

The image associating means 30 retrieves the sharee information of person subjects identified and classified into groups by the subject identifying means 26 from the sharee information storing means 28. Based on the photograph information of each image and the retrieved sharee information, the image associating means 30 then extracts the images to be associated with an identified person subject and the images corresponding to the preferences of the person subject from the images assessed as not including a person, and classifies these images as images associated with the identified person subject.

Image association will now be described in detail with reference to FIG. 5.

Figure 5:
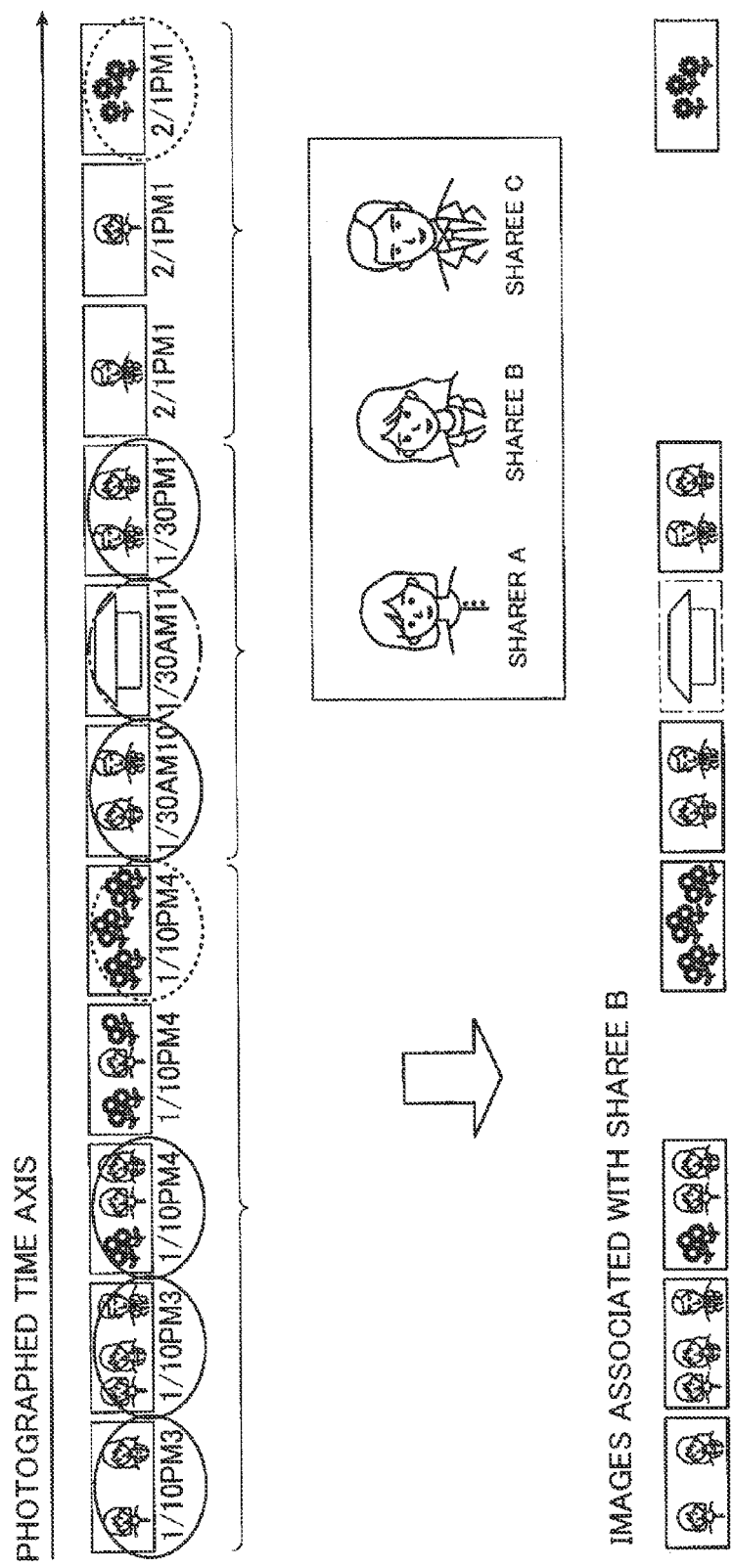
FIG. 5 is a conceptual diagram showing an example of a method for extracting images associated with a sharee.

In FIG. 5, the images encircled by a solid line are images classified as a group in which sharee B has been identified as a person subject by the subject identifying means 26, and all include sharee B.

First, using the photograph information of each image, the image associating means 30 extracts information associated with the person subjects. Here, if the difference between the time at which an image that does not include a person was taken and the time at which an image classified into the group was taken is within a certain range, the image associating means 30 assesses that the image that does not include a person is associated with the identified person subject of the classified image, and classifies that image into that group. For example, in FIG. 5, given a time difference range of two hours, the image encircled by an alternate long and short dashed line was taken within just an hour from the image on the left and, thus, the two images are assessed as associated and classified into the group of sharee B.

Next, using the sharee information of the identified person subject corresponding to the classified group, the image associating means 30 extracts the preferred images of the sharee.

In FIG. 5, the sharee information of sharee B corresponds to sharee ID "00001" of FIG. 3. The preferred image keywords of sharee B are "plants" and "flowers."

Based on these keywords, the image associating means 30 extracts images of flowers from the images that do not include a person, and classifies these images as preferred images of sharee B. In FIG. 5, the two images encircled by a dashed line are images of flowers. These images, therefore, are extracted as preferred images of sharee B and classified into the group of sharee B.

Further, the preferred image keyword is not limited to the name of a subject, but may also be a color and so forth. For example, when "pink" is registered as a keyword, an image with a large pink area may be extracted and classified as an image associated with sharee B, based on the color information that results from image analysis.

Image extraction based on preferred image keywords may be performed by analyzing images using a known method and searching for associated images based on image characteristics, or by adding scene information or keywords to each image as tag information in advance at the time the image is taken and comparing those keywords with the preferred image keywords provided in the sharee information.

As described above, the associated images and preferred images of sharee B are then classified into a group.

The shared image determining means 32 determines the images to be shared with the sharee from among the images classified into groups on a per person subject basis by the subject identifying means 26 and the image associating means 30. The shared images are determined based on sharing rules stored in the sharing rules storing means 34 described later.

Here, the image sharing system 10 of the present invention automatically shares all classified images with sharees that correspond to the images. However, there are also cases where the classified images include poorly photographed images, and the sharer may not want to set all images as images subject to sharing. In such a case, to assess whether or not an image is subject to sharing, the sharer registers conditions for image sharing in advance as sharing rules.

An example of a sharing rule includes a setting that first indicates whether all images are to be subject to sharing or whether only those images that match specific conditions are to be subject to sharing. In a case where all images are to be subject to sharing, all images classified in the system are shared.

On the other hand, in a case where only images that match specific conditions are to be subject to sharing, conditions for image sharing are further set.

Such conditions may include, for example, a setting that indicates that only images that include a person are to be subject to sharing. Further, in a case where an image includes a person, whether or not the image is to be shared may be set in accordance with the photograph quality of the identified person, such as the sharer, the sharee, or another person subject. For example, a setting may be set so that a poor quality image, such as a blurred image, red eye image, sideways image, or non-smiling image, of the identified person is not shared. Or, a setting may be set so that an image is not shared if all person subjects in the image are of poor photograph quality.

Furthermore, in the case of an image that does not include a person, a setting may be set so that the image is shared if the image is not blurry, or if the image has been extracted by the image associating means 30 based on photograph information, or if the image has been extracted by the image associating means 30 based on sharee information, for example.

Setting the sharing rules in advance in this manner makes it possible for the sharer to extract and share images that will be received more favorably and with greater joy by the sharee.

The sharing rules are stored in the sharing rule storing means 34. The sharing rules may be uniquely set in the system, or may be set differently on a per sharer basis. The sharing rules may also be suitably changed as needed.

The shared page creating means 36 lays out the shared images determined by the shared image determining means 32 in album format, and creates the shared page to be shared with the sharee.

The layout is automatically created in accordance with the layout of the album of the sharer, and the created page is added to the album of the sharer. Further, the images may be arranged so that those of persons with a high sharee level are put together on the same page, based on the sharee sharee level stored in the sharee information storing means 28, for example.

The shared page creating means 36 comprises a function that sets access destination information, such as the URL for accessing the created image shared page, and a function that associates the set access destination information with the shared page and stores the result as sharing information.

The shared page notifying means 38 notifies the sharee that a shared page was created. The information notified may include the information of the sharer, the number of shared pages, and the photograph information of each image.

The user who receives the notification checks the content, assesses whether or not he or she wants to add the shared page, and issues an instruction to add or not add the shared page to the server 12.

The layout changing means 40 changes the layout of the shared page to the layout of the album of the sharee when the shared page created and stored in the album of the sharer based on the preferred layout information of the sharer by the shared page creating means 36 is to be added to the album of the sharee, thereby ensuring the overall consistency and easy-to-view quality of the album of the sharee.

The layout changing means 40 automatically changes the layout of the shared page based on the preferred layout information of the sharee stored in the sharee information storing means 28, the preferred layout information of the sharer, and the inherited information stored in inherited information storing means 42 described later, when the sharee who receives a notification from the shared page notifying means 38 issues an instruction that enables addition of the shared page. Further, the sharee information used by the shared page creating means 36 may be used again when the layout is changed.

With this arrangement, it is possible to create the shared page using a layout that matches the preferred layout information of the sharee.

Further, the layout changing means 40 adds information such as information related to the transmission source (sharer) of the laid out images and information on the date the image was taken as sharing information on a per shared page basis. The sharing information may be added as tag information, for example, on a per shared page basis.

Based on the tag information, pages may be organized in chronological order or put together and edited by the sharer. Further, a table of contents of the album may be created using tag information.

The inherited information storing means 42 stores the preferred layout information of the sharer that is used by the layout changing means 40 for changing the layout as inherited information.

Items among the preferred layout information of the sharer that are to be applied to the shared page are set as inherited information.

Here, the method of sharing the shared page of the present invention will be described with reference to FIG. 6.

Figure 6:
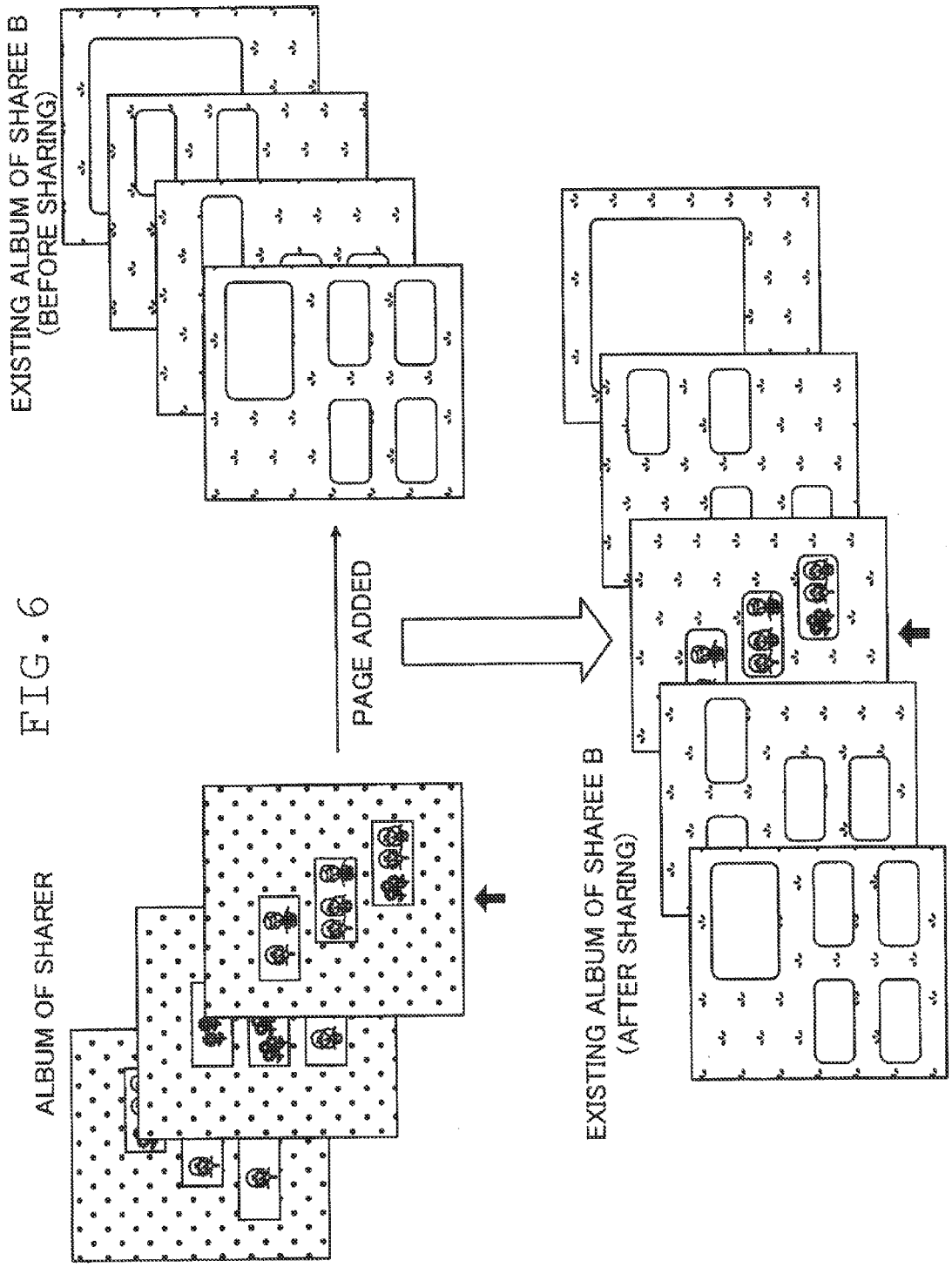
FIG. 6 is a conceptual diagram showing an example of a sharing method for each shared page.

In FIG. 6, the third page of the album of sharer A is to be shared with sharee B as a shared page. Further, the image order and arrangement are set as the inherited information.

At this time, the layout changing means 40 refers to the layout of the album of the sharer for the image order and arrangement, and changes the layout of the shared page to match the layout of the album of the sharee for all items not set in inherited information, such as the color of the photo mount, the trimming, and the like.

In the example shown in FIG. 6, the image order and arrangement are the same as those of the third page of the album of the sharer, and the color of the photo mount and the trimming are the same as those of the album of sharee B, with the four corners of each image rounded.

Furthermore, while the image order and arrangement are set as the inherited information in the present embodiment, the present invention is not limited thereto. The inherited information as well as the preferred layout information may include various other settings related to the album, such as the photo mount and trimming.

In this manner, the layout changing means 40 changes the layout of the shared page into an easy-to-view format using the inherited information, the preferred layout information of the sharer, and the preferred layout information of the sharee, taking into consideration the intention of the sharer and without causing any sense of oddness when a page is added to the album of the sharee.

Once the layout has been changed, the layout changing means 40 adds the shared page in a location corresponding to the access destination information, within the album of the sharee.

The shared page sending means 44 notifies the sharee of the access destination information created by the shared page creating means 36 as the browse destination information of the shared page, via known means such as e-mail. The sharee can then access the shared page in accordance with this information.

The completion reporting means 46 reports that all processing has been completed to the sharer when the layout changing means 40 ends the sharing process with the sharee. The reporting method is not particularly limited, and any known means such as e-mail may be used.

Next, the image sharing method of the present invention, and the specific action of a system that uses a saving device for image sharing (image sharing server) of the present invention which achieves the inventive method will be described based on the flowcharts of FIG. 7 to FIG. 9.

Figure 7:
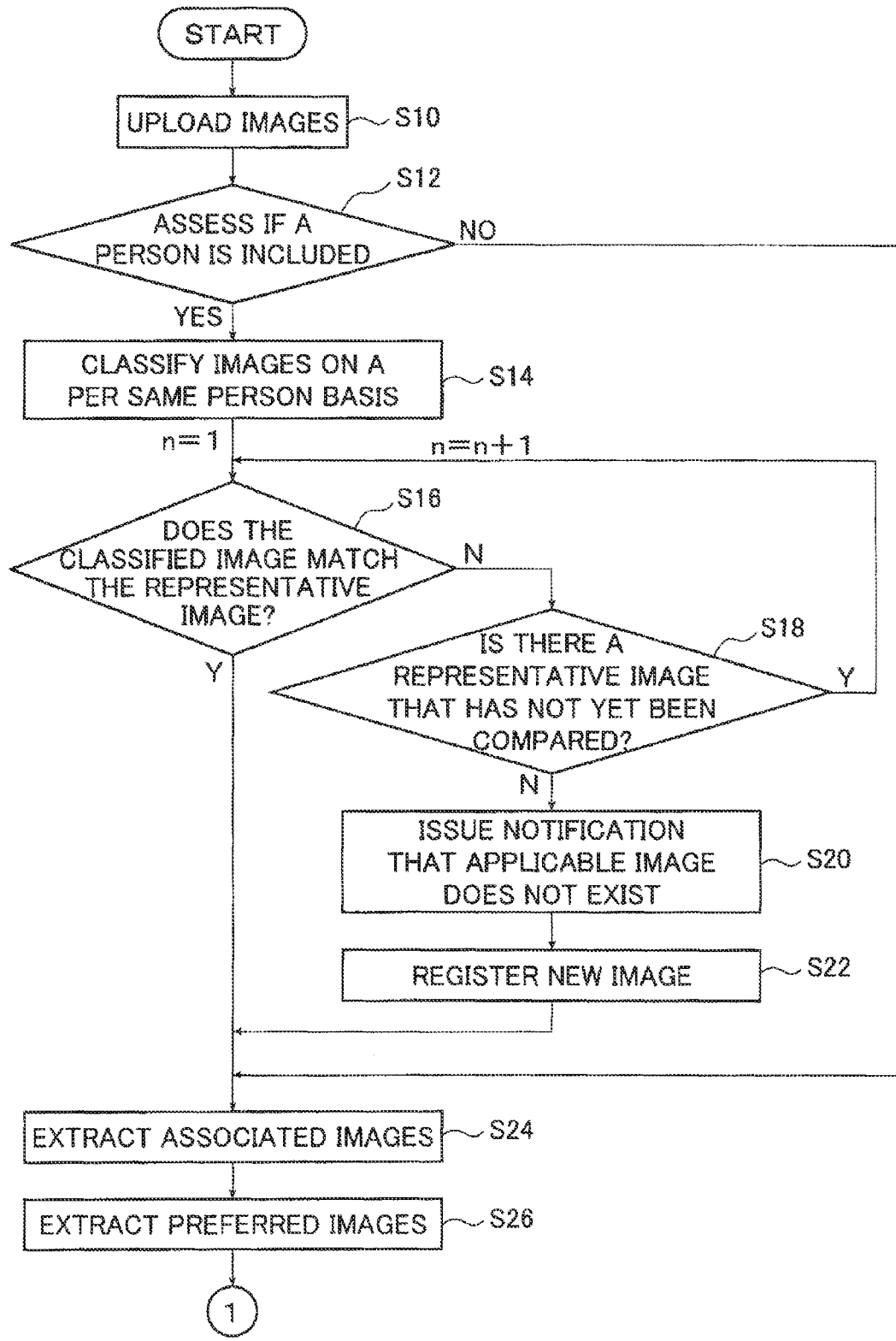
FIG. 7 is a flowchart showing an example of the first part of the flow of an image sharing method of the present invention.

First, in step S10 of FIG. 7, the sharer uploads the images he or she wants to share to the server. The uploaded images are acquired by the image acquiring means 22 and transmitted to the subject assessing means 24. Next, in step S12, each acquired image is assessed as to whether or not the image includes a person by the subject assessing means 24.

In a case where the image includes a person (in the case of "Yes" in step S12), the image is classified into a group of images that include the same face by face recognition processing in step S14. Furthermore, in step S16, the person subjects are identified per classified group.

Identification of person subjects is performed by the subject identifying means 26 by executing face recognition processing based on sharee information.

As described above, face images of the sharees are registered as representative images in sharee information. The subject identifying means 26 compares the representative image of each sharee with the face extracted from the image, and assesses whether or not the two persons are the same.

In a case where there is a plurality of representative images of one sharee, the subject identifying means 26 repeatedly conducts such comparisons based on a priority order, such as in the sequence of the sharee representative image having priority number 1, the sharee representative image having priority number 2, etc., until the subject identifying means 26 can assess that the persons are the same.

When such comparisons are repeated and it is found that a representative image of a person matching the face in the image does not exist even after comparisons have been made with all representative images of the sharees (in the case of "No" in step S18), the subject identifying means 26 assesses that sharee information is not registered for that person and notifies the sharer accordingly, prompting the sharer to register new sharee information (step S20). This notification may be performed by any applicable known notifying means, such as screen display or audio.

The sharer who receives the notification then registers sharee information for the person subject using the image used for comparison by the subject identifying means 26 as the representative image (step S22). Note that the representative image used for new registration is not limited to that image, and may be newly uploaded by the sharer, for example.

According to the above-described processing, images that include a person are classified into groups per person subject, and the person of each group is identified.

Next, the images that do not include a person are classified into these groups on a per person subject basis.

For those images assessed as not including a person in step S12 (in the case of "No" in step S12), the images associated with the sharee of each group identified by the subject identifying means 26 are extracted and classified into each group by the image associating means 30 (step S24). Furthermore, the image associating means 30 extracts the preferred images of each sharee and similarly classifies those images into each group (step S26).

Figure 8:
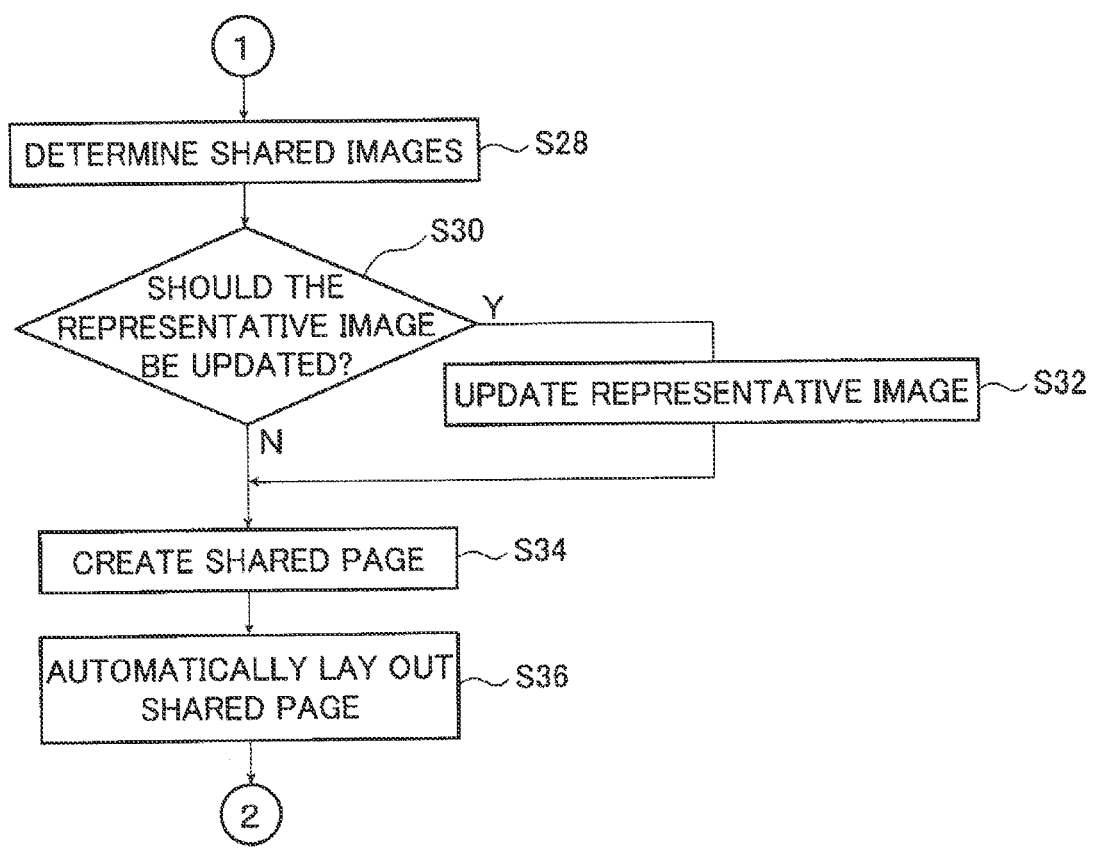
FIG. 8 is a flowchart showing an example of the second part of the flow of the image sharing method of the present invention.

After the images that do not include a person are also classified into each group as described above, the shared images per sharee are determined in step S28 of FIG. 8. Here, the shared image determining means 32 determines the images to be shared with a sharee from among the images classified into each group per identified person subject, based on the sharing rules read from the sharing rule storing means 34. With this arrangement, the images of poor photograph quality of the sharer or the sharee, etc., can be excluded, making it possible to establish only those images that will be enjoyed by the sharee as the images to be shared.

In a case where a more suitable image than the current image registered as the first representative image of a sharee is found during the repeated comparisons performed by the subject identifying means 26, it is advantageous to automatically change the first representative image to that image or to automatically change the priority order. To this end, when the images to be shared are determined and there is a more suitable image to be used as the representative image in step S30 (in the case of "Yes"), the representative image stored in the sharee information storing means 28 is updated (step S32). The decision as to whether or not the representative image is to be updated may be made during the processing performed by the subject identifying means 26.

With this arrangement, the subject is always identified using the most preferred image as the representative image.

Next, in step S34, the shared page of the sharee is created by the shared page creating means 36. The shared page is created by automatically arranging the shared images determined in step S28 on an album page. Furthermore, in step S36, the shared page is automatically laid out. The layout is automatically created based on the layout of the album of the sharer, and the created page is added to the album of the sharer.

Figure 9:
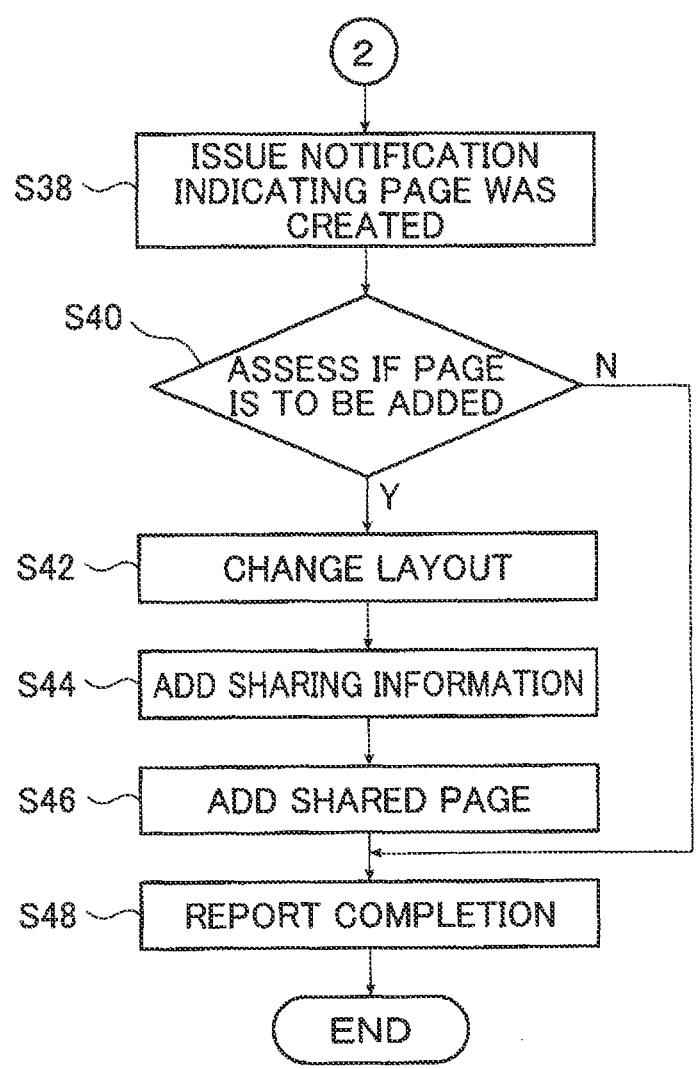
FIG. 9 is a flowchart showing an example of the third part of the flow of the image sharing method of the present invention.

When the shared page is created, a notification indicating that a shared page was created is automatically sent by e-mail, etc., from the shared page notifying means 38 to the sharee in step S38 of FIG. 9. The user who receives the notification checks the notification content, and assesses whether or not to add the shared page in step S40.

In a case where the shared page is to be added (in the case of "Yes" in step S40), the layout changing means 40 automatically changes the layout of the shared page based on the preferred layout information of the sharee stored in the sharee information storing means 28, the preferred layout information of the sharer, and the inherited information stored in the inherited information storing means 42 described later (step S42). Furthermore, in step S44, the sharing information is added to the shared page.

Once the layout of the shared page has been changed in this manner, the shared page is added to the album of the sharee, making the page browseable (step S46).

At this time, the shared page sending means 44 also notifies the sharee of the method for accessing the shared page, such as the URL for accessing the shared page.

The sharee who receives the notification can then access the shared page in accordance with the contents of the notification, and then freely browse the shared page.

Next, in step S48, successful completion of the sharing process is reported to the sharer by the completion reporting means 46.

In this manner, according to the present embodiment, a predetermined area within the album owned by the sharer is automatically shared in a laid out and edited album state, making the images easy to browse and manage for the sharee, in comparison to a conventional method in which just the image data is simply delivered.

Further, because a different layout is created on a per sharer and per sharee basis so as to ensure that the layout matches the layout of the album of each individual, both the sharer and the sharee find the image display easy to view.

While album sharing is achieved in the aforementioned embodiment by setting the shared area in units of a single album page and then creating the shared page, the present invention is not limited thereto, and the shared area may be within a single album page or extend over a plurality of album pages, rather than a single page. Additionally, individual images, album frames, backgrounds, photo mounts, and other decorative pieces may be set in units of a single element. In this case as well, similar to the aforementioned embodiment, the shared area may be set to an area within the album or in units of a single element and then created and shared in such a manner that the layout matches the layout of the album.

Furthermore, when a plurality of sharees exist, different layouts may be provided for image sharing on a per sharee basis.

Further, the image data can be shared in a form enabling easy use by the sharee, without the trouble of having to require the sharee to edit the shared images, etc.

In the embodiment as described above, the sharee is automatically notified by the shared page notifying means 38 and the shared page sending means 44, by e-mail or the like, that a shared page was created, and so forth. According to the present invention, the notification may be made along with additional information varying from sharee to sharee, especially that of preference or strong preference, preferably of strongest preference, or again, of interest or high interest, preferably of highest interest for the relevant sharee.

Figure 10:
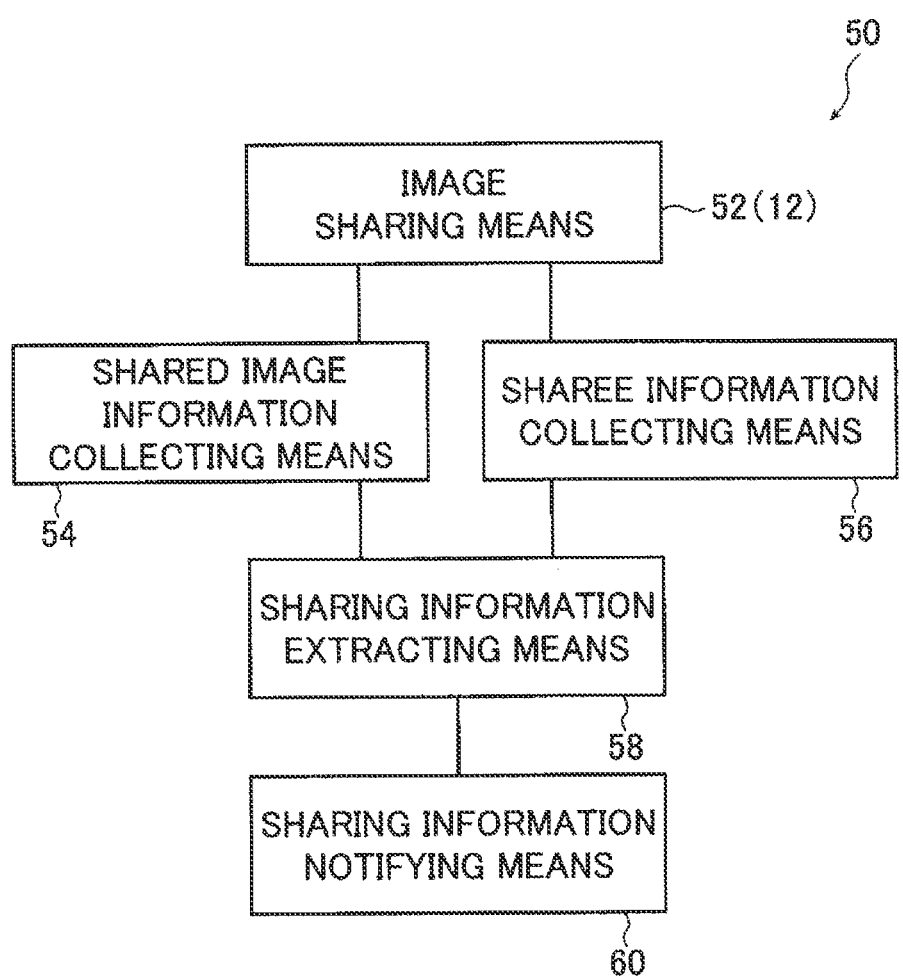
FIG. 10 is a block diagram showing another embodiment of the configuration of a saving device for image sharing of the present invention.

FIG. 10 is a block diagram showing another embodiment of the configuration of the saving device for image sharing of the present invention that is capable of additionally notifying of information varying from sharee to sharee when an image or electronic album is shared.

As shown in FIG. 10, an image server 50, which serves as the saving device for image sharing in this embodiment, comprises an image sharing means 52, a shared image information collecting means 54, a sharee information collecting means 56, a sharing information extracting means 58, and a sharing information notifying means 60.

The image sharing means 52 is adapted to save the images offered by the sharer thereof for image sharing, and accessibly share them among at least one sharee. In the present invention, the image sharing means 52 is preferably the server 12 of FIG. 2, but the present invention is not limited thereto. Any means capable of sharing images by some method or other including conventional ones may be utilized as long as it acquires the images, which are offered by the sharer thereof for image sharing, as the images to be shared with the sharee or sharees, saves the acquired images to be shared, and makes the acquired and saved images to be shared sharable among the sharee(s) in an accessible manner.

The shared image information collecting means 54 is adapted to extract and collect the information on the images to be shared in the image sharing means 52 and the information related therewith as the shared image information under specified conditions associated with the sharee, as well as to classify the images to be shared, and extract and collect the classification information. The shared image information collecting means 54 has one or more of the following functions as seen from the results of shared image information extraction shown in FIG. 11, for instance, and includes means for realizing such function(s): comparing an image to be shared with the image registered in advance in the image sharing means 52 (sharee information storing means 28 of the server 12) as the sharee information so as to count images containing the sharee; comparing the shared image information with the preferred image keywords also registered in advance as the sharee information so as to count images in which the sharee has interest; and extracting and collecting various kinds of information based on the meta-information on an image, such as image size, image-taking date, and image-taking place (GPS information).

In other words, examples of the shared image information to be extracted by the shared image information collecting means 54 include the number of the images containing the sharee, the number of the images preferred by the sharee, the number of the images preferred by the sharee and containing the sharee, the size of the shared images, the date on which the shared images have been taken, and the place where the shared images have been taken, as shown in FIG. 11. The present invention, however, is not limited to the above, and any information is thinkable as the shared image information as long as it can be extracted from the images to be shared and the related information associated therewith in relation to the sharee.

The sharee information collecting means 56 is adapted to collect the information on sharees. The sharee information collecting means 56 has at least either of the function of extracting and collecting the sharee information (profile information of the sharee, for instance) as registered in advance in the image sharing means 52 (sharee information storing means 28 of the server 12), and the function of collecting information from the album information owned by the sharee, and includes means for realizing such function(s).

In other words, examples of the sharee information to be extracted by the sharee information collecting means 56 include the image size (which type of image size is most found), the image-taking date (on what date (in what period) the most images have been taken), and the image-taking place (in what place the most images have been taken), as seen from the results of sharee information extraction shown in FIG. 11. The present invention, however, is not limited to the above, and any information is thinkable as the sharee information as long as it can be extracted from the information associated with the sharee.

The sharing information extracting means 58 is adapted to extract, from the shared image information collected by the shared image information collecting means 54 and the sharee information collected by the sharee information collecting means 56, information concerning the images to be shared in which the sharee has interest as the sharing information specific to the sharee, with the extraction being carried out in a per sharee manner. The sharing information extracting means 58 combines the shared image information and the sharee information to extract the information which is optimal for the sharee, that is to say, the information varying from sharee to sharee, especially that of preference or strong preference, preferably of strongest preference, or again, of interest or high interest, preferably of highest interest for the relevant sharee.

As seen from the results of shared image information extraction and sharee information extraction shown in FIG. 11, for instance, the sharing information extracting means 58 considers the information, for which the sharee wants/seeks most, to be the information in which the sharee has interest, and extracts it as the "sharing information," or concludes from the pieces (1) and (2) of the shared image information that the information piece (3) pleases the sharee most, and extracts the image information (3) as the "sharing information" in such a manner that it may be most conspicuous, or the like. The image information (3) may be made conspicuous by putting it at the head of an album, incorporating the thumbnail-form list of the images in question into the information to be given by e-mail and so forth, or by including in the information to be given such text information as the title or tag of an image.

The sharing information notifying means 60 is adapted to notify the sharee (terminal 16) of the sharing information extracted by the sharing information extracting means 58. The sharing information notifying means 60 may notify the sharee of the sharing information by e-mail, or in an RSS (RDF Site Summary) format when the sharee gets access to the network (web site).

The image server 50 in this embodiment of the present invention has such a fundamental configuration as above.

Next, the image server 50 in this embodiment of the present invention, specific actions of the image sharing system using the server 50, and the image sharing method of the invention are described in reference to the flowchart of FIG. 12 showing an example of the process for notification by the saving device for image sharing.

In step S50, the images offered by the sharer thereof for image sharing are acquired as the images to be shared with the sharee.

In step S52, the acquired images to be shared are saved.

Subsequently, in step S54, the acquired and saved images to be shared are made sharable among the sharee(s) in an accessible manner.

By these steps S50 through S54, the sharer of images can share the images with the sharee.

The steps as above are effected by the image sharing means 52 of the image server 50 of the invention, preferably by the server 12 of FIG. 2, but the present invention is not limited thereto. Any device to which a known sharing method is applied may also be employed.

In the next step S56, the shared image information is collected with respect to the images to be shared. Collecting of the shared image information in step S56 is carried out by the shared image information collecting means 54.

In step S58, information on the sharee is collected by the sharee information collecting means 56.

In step S60, from the shared image information on the images to be shared that has been collected by the shared image information collecting means 54 and the sharee information on the sharee that has been collected by the sharee information collecting means 56, the information concerning the images to be shared in which the sharee has interest is extracted by the sharing information extracting means 58 as the information specific to the sharee.

Thereafter, the image server 50 (server 12) notifies the sharee (terminal 16) of the sharing information extracted by the sharing information extracting means 58 by e-mail or the like.

The image sharing method of the present invention has such a fundamental configuration as above.

While, in the embodiments as described above, the image sharing system 10 comprises the server 12 arranged on a network, the PC 14 of the sharer, the terminal 16 of the sharee, and the image server 18, the present invention is not limited thereto. In the case where the images to be shared are to be uploaded from the PC 14 of the sharer to the server 12, the image server 18 may be omitted. In that case, the image acquiring means 22 of the server 12 acquires the image data on the images saved in the PC 14 of the sharer through the network.

In the image sharing system 10 of the present invention, the images to be shared are saved and accessibly shared among the terminal(s) 16 of the sharee(s) by the server 12 on the network. The present invention is not limited to the above, and the images to be shared may be saved and accessibly shared among the terminal(s) 16 of the sharee(s) by the PC 14 of the sharer in itself, whereupon the PC 14 of the sharer and the terminal(s) 16 of the sharee(s) are connected with each other in a peer-to-peer manner as shown in FIG. 1 by a dotted line. In that case, the PC 14 of the sharer may serve as the saving device for image sharing of the present invention, and the server 12 may be omitted.

While the above has described in detail the image sharing server, system, and method of the present invention, note that the present invention is not limited to the above embodiments and various modifications may be made without departing from the spirit and scope of the invention.

What is claimed is:

1. A saving device for image sharing in which images offered by a sharer of said images for image sharing are saved and accessibly shared in a sharer's album from among at least one sharee, comprising:

an image sharing section configured to share the images offered by said sharer among said at least one sharee as images to be shared in the sharer's album;

a sharee information collecting section configured to collect sharee information on said at least one sharee, said sharee information including first layout information of a sharee's album;

a shared image information collecting section configured to extract and collect information on the images to be shared in the sharer's album in said image sharing section as shared image information under specified conditions associated with said at least one sharee;

a sharing information extracting section configured to extract information concerning the images to be shared in which said at least one sharee has interest of images, in such a manner that it is conspicuous, as sharing information specific to said at least one sharee, from the shared image information collected by said shared image information collecting section and the sharee information collected by said sharee information collecting section;

a shared page determining section configured to determine a shared page to be shared in a sharee's album from said sharer's album;

a layout changing section configured to automatically change a layout of said shared page based on said first layout information of said sharee's album; and shared page notifying means configured to notify said that the number of said shared page was created.

2. The saving device for image sharing according to claim 1, wherein said shared image information collecting section is configured to collect information on images containing said at least one sharee which are obtained by comparing images of said at least one sharee included in the sharee information with the images to be shared and information on images corresponding to keywords showing preferred images of said at least one sharee included in the sharee information from among said images to be shared; and said sharing information extracting section is configured to extract information of images including said at least one sharee and corresponding to the keywords, from the information of the images containing said at least one sharee and the images corresponding to the keywords for each sharee.

3. The saving device for image sharing according to claim 1, wherein said shared image information collecting section is configured to collect information of a size of the images to be shared; and said sharing information extracting section is configured to extract the information of the size of the images to be shared.

4. The saving device for image sharing according to claim 1, wherein said shared image information collecting section is configured to collect information of a date on which the images to be shared have been taken; and said sharing information extracting section is configured to extract the information of the date on which the images to be shared have been taken.

5. The saving device for image sharing according to claim 1, wherein said shared image information collecting section is configured to collect information of a place where the images to be shared have been taken; and said sharing information extracting section is configured to extract the information of the place where the images to be shared have been taken.

6. The saving device for image sharing according to claim 1, wherein said sharing information extracting section makes said information concerning the images to be shared in which said at least one sharee has interest of images is made conspicuous by putting the images including said at least one sharee and corresponding to the keywords at a head of images laid out in an album format.

7. The saving device for image sharing according to claim 1, further comprising:

a sharee layout storing section configured to store said first layout information of the sharee's album.

8. The saving device for image sharing according to claim 1, further comprising:

a sharing information notifying section configured to notify said at least one sharee of said sharing information extracted by said sharing information extracting section.

9. The saving device for image sharing according to claim 8, wherein said sharing information notifying section notifies said at least one sharee of the sharing information by e-mail.

10. The saving device for image sharing according to claim 9, wherein said sharing information extracting section makes said information concerning the images to be shared in which said at least one sharee has interest of images is made conspicuous by incorporating a thumbnail-form list of the images including said at least one sharee and corresponding to the keywords when notifying said at least one sharee of the sharing information by e-mail.

11. The saving device for image sharing according to claim 10, wherein said information concerning the images to be shared in which said at least one sharee has interest of images is further made conspicuous by including text information as a title or a tag of the images including said at least one sharee and corresponding to the keywords.

12. The saving device for image sharing according to claim 8, wherein said sharing information notifying section notifies said at least one sharee of the sharing information in an RDF Site Summary format when the said at least one sharee gets access to a network.

13. The saving device for image sharing according to claim 1, further comprising:

sharing rule storing section configured to store sharing rules which are conditions for determining images to be shared with said at least one share;

wherein said image sharing section determines said images to be shared based on said sharee information and said sharing rules.

14. The saving device for image sharing according to claim 13, wherein said sharing rules are registered or updated by said at least one sharer of said images to be shared.

15. The saving device for image sharing according to claim 1, wherein said layout changing section adds information related to said shared page subjected to a layout change, as sharing information for each shared page.

16. The saving device for image sharing according to claim 15, wherein said sharing information includes sharer information and photographed date and time of an image laid out in said shared page.

17. The saving device for image sharing according to claim 1, further comprising a sharing information storing section configured to store said sharing information.

18. The saving device for image sharing according to claim 1, further comprising:

a sharer layout storing section configured to store second layout information of said sharer's album; and an inherited information storing section configured to store types of layout information to be inherited by said shared page from among said second layout information stored by said sharer layout storing section, wherein said layout changing section further automatically changes the layout of said shared page based on said second layout information of said sharer and said inherited information.

19. An image sharing system in which a sharer of images offers said images for image sharing so that said images are accessibly shared among at least one sharee, comprising:

the saving device for image sharing according to claim 1; and a terminal of said at least one sharee that accesses images shared on said saving device for image sharing.

20. The image sharing system according to claim 19, further comprising:
- a terminal of said sharer that saves and uploads onto said saving device for image sharing said images; and
- a network on which said saving device for image sharing is disposed,
- wherein the terminal of said sharer and the terminal of said at least one sharee are connected with said saving device for image sharing through the network.

21. An image sharing method in which images offered by a sharer of said images for image sharing are saved in a saving device for image sharing and accessibly shared among at least one sharee as a sharer's album in the saving device for image sharing, comprising:
- storing in advance first layout information of a sharee's album;
- determining a shared page to be shared in said sharee's album from said sharer's album;
- changing automatically a layout of said shared page based on said first layout information of said sharee's album; and
- notifying said at least one sharee that the number of said shared page was created, as well as
- sharing the images offered by said sharer among said at least one sharee as images to be shared in the sharer's album;
- collecting sharee information on said at least one sharee, said sharee information including the first layout information of the sharee's album;
- extracting and collecting information on the images to be shared in the sharer's album as shared image information under specified conditions associated with said at least one sharee; and
- extracting information concerning the images to be shared in which said at least one sharee has interest of images, in such a manner that it is conspicuous, as sharing information specific to said at least one sharee, from the shared image information as collected and the sharee information as collected.

22. The image sharing method according to claim 21, further comprising: notifying said at least one sharee of said sharing information as extracted.

23. The image sharing method according to claim 21, further comprising:
- storing in advance second layout information of said sharer's album and inherited information which includes types of layout information to be inherited by said shared page as selected from said second layout information of the sharer's album; and
- changing automatically the layout of said shared page based on said second layout information of said sharer and said inherited information.

24. The image sharing method according to claim 21, further comprising a step of storing information related to said shared page subjected to a layout change as sharing information for each shared page.

25. The image sharing method according to claim 24, wherein said sharing information includes sharer information and photographed date and time of an image laid out in said shared page.

26. The image sharing method according to claim 21, wherein said saving device for image sharing is an image sharing server disposed on a network, in which said images uploaded by said sharer can be saved and accessibly shared among said at least one sharee.

27. The saving device for image sharing according to claim 1, wherein said layout changing section adds said shared page subjected to a layout change to said sharee's album.

* * * * *